Nov. 16, 1937. F. V. RISINGER Re. 20,557
HYDROCARBON FUEL BURNING SYSTEM
Original Filed May 31, 1930
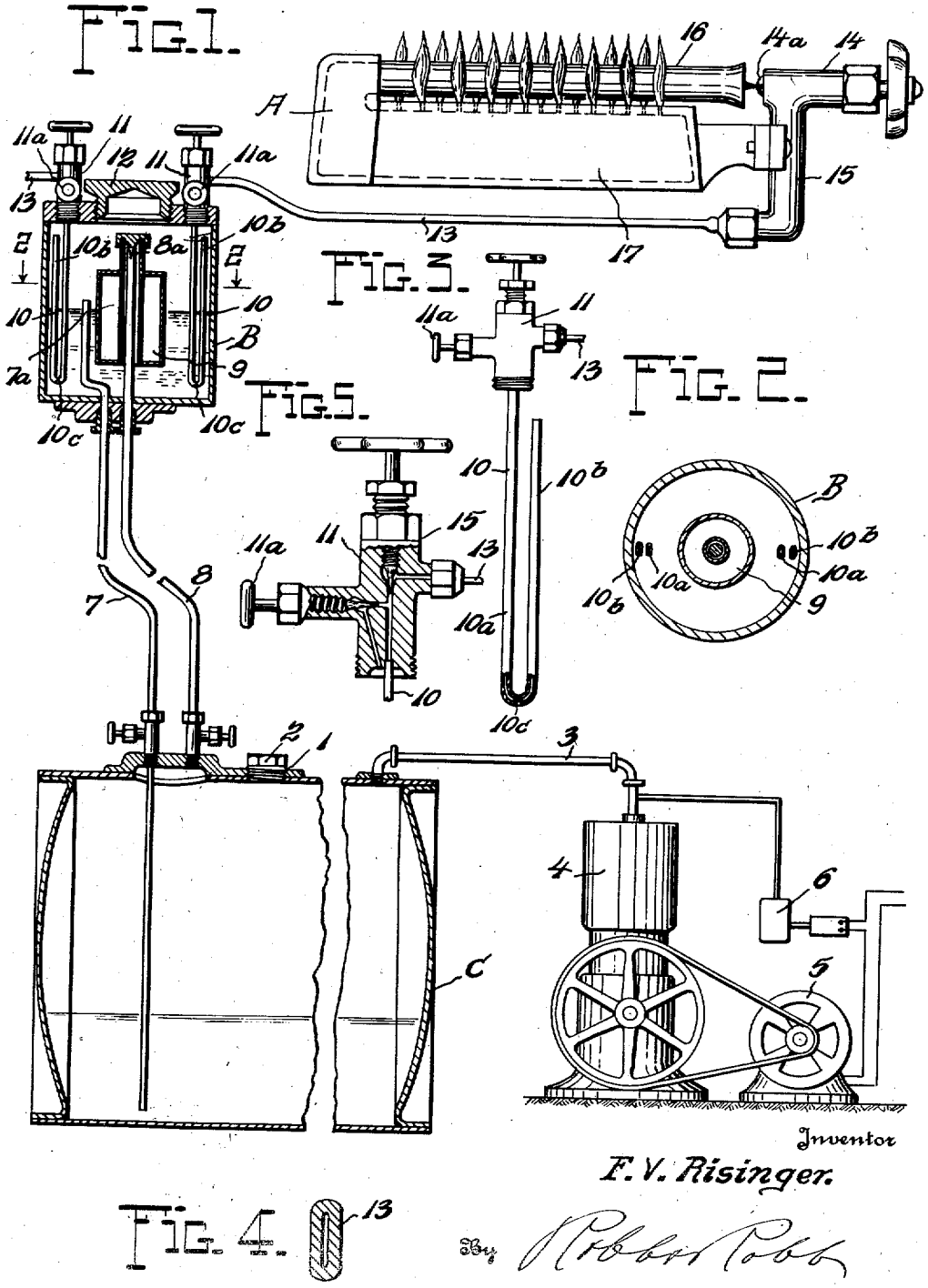

Reissued Nov. 16, 1937

Re. 20,557

UNITED STATES PATENT OFFICE 20,557

HYDROCARBON FUEL BURNING SYSTEM

Frank V. Risinger, Lakewood, Ohio

Original No. 1,988,334, dated January 15, 1935, Serial No. 458,327, May 31, 1930. Application for reissue October 9, 1936, Serial No. 104,870

37 Claims. (Cl. 158—53)

This invention has to do with the art of hydrocarbon burning apparatuses and appliances, and involves the apparatus or system, and a process, for burning in gaseous or vaporized condition, a liquid hydrocarbon mixed with air.

Perhaps the most available hydrocarbon at present on the market is gasolene, and it is highly desirable to produce, if possible, a burner appliance and method of burning a hydrocarbon of this nature, for household, furnace, and any other uses required. It has been proposed to introduce into a hydrocarbon liquid such as gasolene, different chemicals which will reduce the possibility of condensation at or before it reaches the burner when the liquid fuel is vaporized and supplied to the burner for ignition. So far as I am advised, it has not been proposed heretofore to vaporize and burn gasolene, or the like without the use of such chemicals due to the fact that the vaporized hydrocarbon fluid supplied to the burner condenses before it reaches the burner jets or openings. The formation of the condensate under the conditions stated creates all sorts of difficulties and prevents any efficient utilization of a burner for the liquid hydrocarbon vapor, so that those burners and methods of burning liquid hydrocarbon of the kind mentioned that have been heretofore proposed, have not proved practicable and efficient in action.

Now in the carrying out of my invention I propose to thoroughly atomize or carburet the liquid hydrocarbon, such as gasolene, as a primary step of my method, mix this hydrocarbon with a much larger amount of air, proportionately speaking, then preheat the atomized mixture of hydrocarbon and air, and supply the preheated mixture to the burner in such condition so as to avoid the possibility of any condensation of the atomized particles such as will create the difficulties heretofore experienced.

The method above set forth I carry out by an apparatus which involves suitable provisions for properly atomizing the liquid hydrocarbon, these provisions preferably involving the preliminary atomizing of the hydrocarbon in the presence of air, or by air under pressure, then introducing the atomized hydrocarbon fuel into a heating type of structure of a Bunsen tube so that a large quantity of air will be mixed with the now atomized hydrocarbon as it enters the Bunsen tube by an injector action, and providing means to heat the Bunsen tube which receives the atomized hydrocarbon and admixed air, this preheating action doing entirely away with the formation of any condensate previous to the delivery of the vaporous hydrocarbon and air mixture to the burner jets. Owing to the fact that my highly atomized fuel comprising the hydrocarbon vapor and admixed air is preheated during the effective operation of my burner appliance, the combustible constituents of the mixture are burned with a substantially perfect combustion effect, and it is possible, by special formation of my burner means, to utilize the final mixture or fuel from which the combustion is produced, to heat the Bunsen tube incident to the burning of said fuel at the jet openings of the burner proper. Due to the fact that the atomized hydrocarbon and air mixture supplied to the Bunsen tube which acts as a preheating means is in a finely divided, highly atomized condition and contains a substantial proportion of air as a part of the mixture, high combustibility of the mixture exists and it may be readily burned directly from the burner jets and ignited without preheating as an effective immediately available combustible mixture, even though after the burning has started the burner jets are utilized to heat the Bunsen tube or preheating devices for the purpose of preventing condensation of the vapor in the fuel mixture.

Another object of my invention is to provide a hydrocarbon fuel burning system in which is utilized a closed hydrocarbon liquid fuel receptacle for supplying the atomized fuel to the burner together with air under pressure, said receptacle being provided with means for maintaining a constant supply of fuel therein, together with means for maintaining a constant pressure for delivery of the fuel with air to the burner in a carbureted or atomized form.

A further object of my invention is to provide a fuel reservoir of comparatively small size which may be conveniently located with respect to the burner, said reservoir being provided with means for maintaining a constant liquid level therein and also being provided with means for maintaining a constant supply of air under pressure on the fuel and to provide a main reservoir or supply tank which is connected to the first mentioned reservoir by air and liquid supply pipes, the supply tank being of greater capacity than the reservoir and preferably located in the basement or outside of the building in a convenient place for filling the same with the hydrocarbon to be burned in the burner. Also means are contemplated to supply air under pressure to said supply tank, said pressure being effective to move the liquid from the supply tank through the liquid supply conduit to the auxiliary tank, the liquid level determining means closing the air supply pipe until the predetermined level within the auxiliary reservoir has been reached, whereupon the air pipe becomes vented to permit air under pressure to equalize the pressure between the two reservoirs to prevent further flow of liquid from the supply tank until the level again drops below a predetermined point.

Another object of my invention is to provide a hydrocarbon vaporous fuel burner and associated reservoir of comparatively small size for supplying fuel to the burner in a highly carbureted and atomized condition, said reservoir being provided with means for maintaining a predetermined quantity of hydrocarbon therein which is supplied from a main reservoir under air pressure as the fuel in its atomized form is being withdrawn from the auxiliary reservoir.

Other and further objects and advantages of the invention will become apparent as the description of the invention proceeds.

For a full and more complete understanding of the invention, reference may be had to the following description and accompanying drawing, in which—

Figure 1 is a view of my improved hydrocarbon vapor burning system, parts being broken away and shown in section.

Figure 2 is a section on the line 2—2, of Figure 1, looking in the direction of the arrow.

Figure 3 is an enlarged detail view of my carbureting and vaporizing device, and Figure 4 is a sectional view through the conduit leading from the supplemental reservoir to the burner.

Figure 5 is an enlarged detail view of my control valve associated with the atomizing device.

In the drawing A indicates generally my improved hydrocarbon burner which is supplied with hydrocarbon fuel in a highly atomized and carbureted state from my auxiliary carbureting supply receptacle B.

The main supply tank indicated at C is preferably disposed exteriorly of the building in which the burner A and auxiliary receptacle or reservoir B are located, the supply tank C being provided with the filling opening 1 having a suitable closure plug 2 and means for supplying air under pressure thereto through a pipe 3 consisting of a compressor 4 operated by any suitable power source such as a motor 5. Associated with the compressor is a pressure responsive controlling device 6 for discontinuing the operation of the motor and compressor when the pressure within the system reaches a predetermined degree, and automatically starting again when the pressure goes below a predetermined degree.

The main supply tank C has leading therefrom a fuel delivery pipe 7 and an air delivery pipe 8. These pipes communicate with the interior of the auxiliary receptacle B, the pipe 7 terminating at approximately the level of the liquid as indicated at 7*a* in the receptacle B. The pipe 8 is disposed centrally of the receptacle B and carries thereon a liquid controlled closure member or float actuated valve 9 which becomes operative to close the end 8*a* of the pipe 8 when the liquid level drops below a predetermined point within the receptacle at B.

Disposed within the receptacle B which is provided with a plug 12 for cleaning, inspection, and assembly purposes, are fuel carbureting or atomizing devices indicated generally at 10, and shown in Figure 3. These devices introduce the fuel in a highly atomized form through the control valves 11 which control the quantity of atomized fuel and air passing to the burner A through the conduits 13, the particular cross section of which is shown in Figure 4.

This flat conduit 13 in its particular form prevents the change of the fuel from atomized to condensed state during its passage therethrough to the burner A.

The burner includes a valve 14 having a laterally extending conduit 15 to which the conduit or pipe 13 is secured. The fuel in its atomized form is injected into the open ended heating pipe or Bunsen tube 16 whereupon as it passes therethrough is heated by the flames of the burner and further vaporized or expanded as it enters the gas chamber 17, whereupon it passes through the burner openings and is burned in the usual manner. The valve 14 serves also as a supplementary atomizing means, maintaining the fuel in finely atomized condition in the jet of fuel which is injected into the tube 16.

It should be observed that the atomized fuel as it is injected into the end of the annular pipe 16 causes the necessary additional air for proper combustion of the fuel to be sucked in therewith, adjacent to the jet 14*a*.

In the operation of the device, the plug 2 of the main supply tank C is removed and the tank filled with the necessary quantity of hydrocarbon, whereupon the plug is replaced and the motor 5 started to cause the compressor 4 to deliver air to supply tank C through the pipe 3.

As the pressure within the tank increases, fuel is forced upwardly through the pipe 7 into the auxiliary reservoir B.

This operation can of course only take place assuming that the burner A is in operation to cause a reduction of pressure within the auxiliary reservoir.

Fuel will continue to flow through the pipe 7 until the level of the fuel rises to a point where the float control valve member 9 will be lifted. This action vents the pipe 8, permitting air under pressure from the supply tank C to pass through the pipe 8 into the auxiliary reservoir B which will of course equalize the pressure between the reservoir and the receptacle, causing any liquid above the level as indicated by the end 7*a* of the pipe 7 to return through this pipe to the main supply tank.

When the level drops sufficiently within the receptacle B, the float valve member 9 will again close the end 8*a* of the pipe 8, causing a reduction of pressure between the receptacle and tank whereupon the higher pressure in the tank will again force the liquid upwardly through the pipe 7 until the level is again established.

The carbureting device or atomizer 10 consists of a U-shaped pipe 10*a* having one end in communication with the control valve 11 and the other end disposed above the level of the liquid as indicated at 10*b*. The pipe 10*a* extends downwardly intermediate its ends well below the level of the liquid and is provided with a small fuel receiving opening 10*c*.

When the burner is in operation the pressure within the receptacle B causes air to flow through the open end 10*b* downwardly past the opening 10*c*, and upwardly into the control valve 11. Pressure on the liquid within the tank B also causes a certain amount of the liquid to pass into the opening 10*c*, but due to the relatively minute size of this opening, the liquid is completely atomized by the air passing through the pipe before it reaches the valve 11. The valve 11 is provided with an auxiliary air supply control valve 11a for admitting additional air under pressure from the receptacle B into the vaporous mixture as it is conveyed from the valve through the conduit 13 through the burner A.

In hydrocarbon burning systems it has been heretofore proposed to convey the fuel in a liquid state to the burner whereupon it is introduced into a generator tube which must be maintained heated to a comparatively high degree in order to vaporize the fuel before it enters the burner. This construction usually necessitates the preheating of the generator tube which positively prevents immediate ignition and positive control of the vaporized fuel as it enters the burner.

In my improved apparatus I am able to completely atomize the fuel without the necessity of the preheating above referred to and convey the fuel to the burner in this highly atomized condition whereby it may be immediately ignited and thus readily employed for burner starting purposes, even though subsequently it may be heated additionally to increase its efficient finally divided condition in which it will be burned during continuous use of the burner.

Means are also provided for regulating the flow of the atomized fuel to the burner whereby the flame may be controlled as desired.

With my apparatus I obtain a most flexible control of the richness of the ultimate gas generated from such liquid hydrocarbons as gasoline, for which my invention has especially been designed. Thus I effect preliminary automatic admixture of air from the main liquid fuel supply tank with the rich fuel in the auxiliary fuel reservoir, a supplemental mixture of air under manipulatable control with the vaporized fuel produced in the auxiliary reservoir, and further additional admixture of amospheric air with fuel quantity control, with the already highly vaporized fuel, at the location of the jet or jets 14a, from which the highly atomized fuel is injected into the heating or Bunsen pipe 16. The nicety of control thus obtained makes for the generation of a pure fuel vapor direct from liquid fuel, such as gasoline, in a manner not heretofore secured so far as I am at present advised. The disadvantages of being required to burn a poorly developed and largely moist fuel gas so generally produced by burning apparatus of the type of this invention, are thus largely obviated, along with carbon troubles and consequent inefficiency.

Having thus described my invention, what I claim as new and desire to secure by Letters Patent of the United States, is—

1. In a hydrocarbon burning apparatus of the class described, a hydrocarbon burner, a main fuel and air supply, an auxiliary fuel and air supply, means for supplying air and fuel from said main supply to said auxiliary supply instrumentalities in the auxiliary supply for converting the fuel into a mist-like condition, means for supplying fuel and air in the mist-like condition from said auxiliary supply to said burner under pressure, and means in the auxiliary supply for varying the ratio of air and fuel supplied by the last named means, the fuel being burnable without preheating.

2. In a hydrocarbon burning apparatus of the class described, the combination with a hydrocarbon burner, including a fuel heating tube of a main liquid fuel supply tank, means for supplying air under pressure to said tank, an auxiliary liquid fuel and air receiving receptacle, air and liquid conduits establishing communication between said tank and receptacle for supplying air and liquid fuel to said receptacle under pressure, a valve member associated with said air pipe to render the pressure within the tank effective to move the liquid from the tank to the receptacle upon a reduction of the quantity of fuel in the receptacle, said valve being operable when a predetermined quantity of liquid has been introduced into the receptacle to establish an equilibrium of pressure between the tank and receptacle, atomizing means associated with the receptacle, means for conveying the atomized fuel in atomized state to the burner, and means for supplying additional air from the receptacle to said atomized fuel mixture.

3. In a hydrocarbon conditioning and burning apparatus of the class described, a hydrocarbon burner, a main fuel and air supply, an auxiliary fuel and air supply, means for supplying air and fuel from said main supply to said auxiliary supply, means in the auxiliary supply for converting fuel therein into a mist-like condition, means for continuously supplying fuel and air under substantially constant pressure and in the mist-like condition from said auxiliary supply to said burning apparatus for as long as a flame continues at said burner, and instrumentalities in the auxiliary supply for adjusting the amount of air admitted to the fuel.

4. A hydrocarbon conditioning and burning apparatus of the class described, comprising, in combination, a burner structure, a liquid hydrocarbon fuel supply associated with said burner, atomizing means within said supply to convert the hydrocarbon into a mist-like condition, means for supplying the mist-like hydrocarbon together with air to the said burner structure in mist-like condition, the burner structure comprising a burner and a Bunsen tube associated with the burner and interposed between the atomizing means and the burner to receive the fuel in mist-like form, the burner being adapted to burn the resulting hydrocarbon mixture without preheating, while the burner when started preheats further quantities of the mist-like hydrocarbon in the said Bunsen tube above its condensation point before it is burned by the burner and after it leaves the atomizing means.

5. In a hydrocarbon conditioning and burning apparatus of the class described, a burner structure, a liquid fuel supply, carbureting means associated with said supply and said burner for converting the fuel into a mist-like condition, means for supplying air under pressure to said carbureting means, the said burner structure comprising a burner, a Bunsen tube associated with the burner and continuously receiving mist-like fuel from the said supply, and a needle valve for controlling the supply of carbureted and mist-like fuel to the burner structure and for further carbureting the fuel, the burner being adapted to initially burn the carbureted fuel without preheating the same, although the said Bunsen tube is positioned intermediate the carbureting means and the burner, the mist-like fuel passing into the Bunsen tube after the first ignition of the fuel being thereby heated above its condensation point before it is burned by the burner and after it leaves the carbureting means.

6. A liquid fuel burner for cooking and other purposes, including a fuel conditioning system, which comprises a fuel and air supply, a carburetor for creating a mixture of fluid hydrocarbon and air, a Bunsen tube, a valve having a restricted outlet to inject said mixture into the Bunsen tube to supply additional air thereto, a burner to direct heat against the wall of said Bunsen tube, for heating said mixture of hydrocarbon and air to form a gas-like condition of said mixture while passing through the Bunsen tube and before it is burned at the outlet of said burner, means for supplying air from said fuel and air supply to the fuel before the same passes to the burner, atmospheric air being supplied to said Bunsen tube.

7. In an apparatus for burning liquid hydrocarbons in vaporized condition, a liquid hydrocarbon supply, means for subjecting liquid from such supply to the action of air to highly atomize said liquid, a Bunsen tube arranged to receive the atomized liquid, a jet for supplying said atomized liquid to the Bunsen tube and spaced from the mouth of said tube so that as the liquid is supplied to the Bunsen tube a proportionately larger amount of air is drawn into the tube with the atomized fuel, and a burner, the jets of which are arranged so that the fuel burned at said jets will heat the Bunsen tube, and means for conveying the vaporized mixture of hydrocarbon and air from the Bunsen tube to the burner.

8. In a hydrocarbon burning apparatus of the class described, a Bunsen tube, atomizing means associated with said burning apparatus for supplying a jet of hydrocarbon fuel in carbureted form to said Bunsen tube of the burning apparatus, means for supplying additional air to said Bunsen tube, and means associated with the burning apparatus for pre-heating the supply of carbureted fuel and air in the Bunsen tube after it leaves the jet and before it reaches the said last named means.

9. In a hydrocarbon burning apparatus of the class described, a Bunsen tube, atomizing means associated with said Bunsen tube, means for supplying liquid fuel and air to said atomizing means, means for variably supplying atomized fuel with air from said atomizing means to said Bunsen tube, and means for preheating the mixture of atomized fuel and air in the Bunsen tube before it is burned by burning apparatus, and after it leaves the atomizing means.

10. In a hydrocarbon burning apparatus of the class described, a burner, an associated Bunsen tube adapted to be heated by the burner, an atomizing fuel jet associated with the Bunsen tube to supply fuel thereto, a liquid hydrocarbon supply, atomizing means associated with said fuel supply and fuel jet for supplying liquid hydrocarbon and air under pressure, to said jet, the said burner being directed toward the Bunsen tube to preheat the atomized fuel therein before it is burned by the burner and after it leaves the jet.

11. A liquid fuel burner and fuel conditioning system which comprises a carburetor for creating a mixture of fluid hydrocarbon and air, a Bunsen tube, a nozzle to inject said mixture into the Bunsen tube to supply additional air thereto, a burner to heat said Bunsen tube, said burner being supplied by said mixture, and means for continuously supplying a carbureted mixture to said nozzle for the continued operation of the burner.

12. A liquid fuel burner for cooking and other purposes, a Bunsen tube connected thereto, a reservoir for the supply of hydrocarbon fluid and air, power means automatically controlled for supplying said air under pressure into said reservoir, a carburetor for creating a mixture of the hydrocarbon fluid with said air, means for conducting said mixture to the burner, said burner and said Bunsen tube being so positioned that the occurrence of a flame at said burner impinges on said Bunsen tube to convert the mixture into a gas-like condition before it enters into the burner body.

13. In a hydrocarbon fuel burning system, a source of liquid hydrocarbon fuel supply, a burner for burning said hydrocarbon, means for conducting said hydrocarbon from said source to said burner, means for admitting air under pressure to said liquid hydrocarbon to atomize the same, means for admitting air to the atomized hydrocarbon to vary the ratio of air to fuel, means for applying heat to the mixture prior to its admission to the burner to vaporize the same, means for controlling the admission of the said fuel to the burner and to the heating means, air being further admitted to the atomized fuel as it passes from the control means into the heating means.

14. A liquid fuel burner and fuel conditioning system which comprises a carburetor for creating a mixture of fluid hydrocarbon and air, a mixing tube, a member having a restricted outlet for injecting said mixture into the mixing tube, for supplying additional air thereto, means for directing heat to the wall of the mixing tube to transform said mixture into a gas-like condition, means for changing the ratio of air and said fuel as required for a combustible mixture after it is heated for the further operation of the burner, a fuel and air reservoir forming an enclosure, a motor, means operated by said motor for storing air in said enclosure under pressure, the air supplied by said last named means passing continuously to the carbureting means and the mixture issuing therefrom passing to the restricted outlet from the start to the end of the flame operation.

15. A liquid fuel burner and fuel conditioning system which comprises a carburetor for creating a mixture of fluid hydrocarbon and air, a burner having an inlet, a member having a restricted outlet for injecting said mixture into said burner inlet and for supplying additional air thereto, said burner heating said mixture and the additional air to transform it into a vapor while passing from said restricted outlet to the burner, and means for supplying the air which is part of said mixture under pressure and thereby permitting said air to pass with said fuel to the burner outlet through all periods of the flame operation.

16. In a liquid hydrocarbon burning system, a reservoir for containing liquid hydrocarbon fuel, a burner, an atomizer, for creating a mixture of fluid hydrocarbon and air, a member having a restricted outlet for conducting said mixture to said burner and for supplying additional air thereto to form a mixture of combustible ratio, mechanical power means for storing air in said reservoir under pressure, means for conducting the air and the fuel from said reservoir to said atomizer, said atomizer creating a mixture of said air and fuel under pressure, said burner heating said mixture and the additional air to transform it into a vapor while passing from said restricted outlet to the burner, said power means acting to supply the air with the fuel to the restricted outlet through all periods of the flame operation.

17. A liquid fuel burner and fuel conditioning system, which comprises a carburetor for creating a mixture of fluid hydrocarbon and air, a mixing tube, a member having a restricted outlet to inject said mixture into the mixing tube and to aspirate additional air into said mixture, a burner to direct heat against the wall of said mixing tube to transform said mixture and the additional air into a gas-like condition while passing to the burner and means for continuously supplying under pressure the air which forms part of said mixture.

18. A liquid fuel burner and fuel conditioning system comprising a main fuel and air reservoir for any desired capacity and suitable to be located outside of a building, an auxiliary fuel and air reservoir suitable to be located inside of a building, means for conducting fuel out from said main reservoir and to said auxiliary reservoir, means operated by power automatically controlled for directing air into said main reservoir and into said auxiliary reservoir under pressure, means for creating a mist-like mixture of said fuel and air for starting a flame, means including said fuel burner for transforming said mist-like mixture into a vaporous mixture for further operation of the flame, said means for creating the mist-like mixture constantly supplying said mixture to the burner and said means for directing air constantly maintaining a pre-determined average amount of the air pressure through all time of the flame operation.

19. A liquid fuel burner and fuel conditioning system comprising a liquid fuel and air reservoir for any desired capacity and suitable to be located outside of a building, a carburetor suitable to be located inside of a building, means for conducting fuel out from said reservoir and to said carburetor, means operated by power automatically controlled for directing air into said reservoir and to said carburetor, said air being under pressure for creating a carbureted mixture of the fuel and air, means for transforming said carbureted mixture and additional air into a vaporous mixture, and means for continuously conducting said vaporous mixture to the burner for supplying a flame through all time of the flame operation.

20. A liquid fuel burner and fuel conditioning system comprising a burner, a main fuel and air supply apparatus, an auxiliary fuel and air supply apparatus, said auxiliary supply apparatus being isolated from said main supply apparatus, means for forcing air into said main supply apparatus and thence into said auxiliary supply apparatus under pressure, means for conducting fuel out from said main supply apparatus and to said auxiliary supply apparatus, a carburetor for creating a mixture of said fuel and air, a Bunsen tube, means for injecting said mixture into said Bunsen tube for supplying said burner, said burner directing a flame against the wall of the Bunsen tube to heat the further supply of said mixture for transforming it into a vaporous mixture for further operation of the burner.

21. A liquid fuel burner and fuel conditioning system comprising means for creating a carbureted mixture of fluid hydrocarbon and air, a conducting means having an air inlet for supplying additional air to said mixture, said conducting means carrying said mixture and additional air to the burner to permit starting of the same, said burner including means for directing a flame to said conducting means for heating the further supply of the carbureted mixture and additional air therewith to transform it into a vaporous condition while passing to the burner, said conducting means being so positioned relative to said flame as to become heated more rapidly than the burner body following ignition of said mixture, said means for creating a carbureted mixture continuously supplying said mixture to the inlet of said conducting means for continuously supplying fuel to said burner through all time of the burner operation.

22. A liquid fuel burner and fuel conditioning system comprising means for creating a carbureted mixture of fluid hydro-carbon and air, of combustible ratio to permit starting of a flame, said burner heating the further supply of said mixture to transform it into a vaporous condition while passing to the burner and means for changing the air and fuel ratio as required for perfect combustion, means operated by power automatically controlled for supplying the air under pressure which is part of said mixture and for maintaining a pre-determined average amount of the air pressure through all periods of the flame operation.

23. A liquid fuel burner and fuel conditioning system comprising means for creating a mist-like mixture of fluid hydrocarbon and air, a mixing tube for conducting said mixture to the burner to permit starting of a flame, said burner impinging the flame against the wall of said mixing tube for supplying heat to transform said mixture into a vaporous condition for further operation of the flame, and means for continuously directing said mist-like mixture into said mixing tube for continuously supplying fuel to said burner through all time of the flame operation, means for supplying the air under pressure which forms part of said mixture and for maintaining a pre-determined average amount of the air pressure through all time of the flame operation.

24. A liquid fuel burner and fuel conditioning system comprising means for creating a carbureted mixture of fluid hydrocarbon and air, a Bunsen tube for conducting said mixture and additional air to the burner to permit starting of the same, said burner including means for directing a flame against the wall of the Bunsen tube to apply heat for transforming said carbureted mixture and additional air into a vaporous mixture while passing to the burner, said means for creating a carbureted mixture continuously supplying such carbureted mixture into the Bunsen tube inlet through all time of the flame operation, means for supplying the air under pressure which forms part of said mixture and for maintaining a pre-determined average amount of the air pressure through all periods of the flame operation.

25. A liquid fuel burner and fuel conditioning system comprising a liquid fuel and air reservoir, a carburetor for creating a mixture of said fuel with air under pressure, a Bunsen tube in communication with said burner, means to inject said mixture into the Bunsen tube and to carry additional air therewith for supplying a flame, said burner directing a flame against the wall of the Bunsen tube to heat the carbureted fuel and additional air therewith to transform it into a vaporous mixture for further operation of the flame, means for maintaining an average amount of the air pressure through all periods of the flame operation.

26. A liquid fuel burner and fuel conditioning system comprising means for creating a carbureted mixture of fluid hydrocarbon with air of a ratio to permit starting of a flame, a Bunsen tube for conducting said mixture to the burner, said burner directing a flame against the wall of the Bunsen tube for heating the mixture to transform it into a vaporous condition and means for changing the air ratio with said fuel as required after the fuel with air has been heated, means for supplying under pressure the air which forms part of said mixture, said air passing with the fuel continuously to the burner through all periods of the flame operation.

27. A liquid fuel burner and fuel conditioning system comprising a means for creating a carbureted mixture of fluid hydrocarbon and air under inclosure and under pressure, means including said burner for transforming said carbureted mixture into a vaporous mixture and means for conducting said vaporous mixture to the burner for supplying a flame, means for supplying under pressure the air which forms part of said carbureted mixture and for maintaining a predetermined average amount of the air pressure through all periods of the flame operation.

28. A liquid fuel burner and fuel conditioning system comprising means for creating a mist-like mixture of fluid hydrocarbon and air, means for constantly transforming said mist-like mixture into a vaporous mixture, means for conducting said vaporous mixture to the burner, means for applying under pressure through all time of the flame operation, the air which forms part of said mist-like mixture.

29. In a hydrocarbon burning apparatus of the class described, the combination with a hydrocarbon burner, of a main liquid fuel supply tank, means for supplying air under pressure to said tank, an auxiliary liquid fuel and air receiving receptacle, air and liquid conduits establishing communication between said tank and receptacle for supplying air and liquid fuel to said receptacle under pressure, a valve member associated with said air conduit to render the pressure within the tank effective to move the liquid from the tank to the receptacle upon a reduction of the quantity of fuel in the receptacle, said valve being operable when a predetermined quantity of liquid has been introduced into the receptacle to establish an equilibrium of pressure between the tank and receptacle, atomizing means associated with the receptacle, and means for conveying the atomized fuel in atomized state to the burner.

30. In a hydrocarbon burning apparatus, a hydrocarbon burner including a Bunsen tube, a main liquid fuel reservoir, means for supplying air under pressure to said reservoir, an auxiliary liquid fuel and air receiving receptacle, air and liquid conduits establishing communication between said reservoir and receptacle for supplying air and fuel to said receptacle under pressure, a valve member associated with the air conduit to render the pressure within the reservoir effective to move the liquid from the reservoir to the receptacle upon a reduction of the quantity of fuel in the receptacle, means associated with the receptacle for mixing the fuel and air, said Bunsen tube conveying the mixed fuel and air to the burner, and means for supplying additional air from the receptacle to said atomized fuel mixture.

31. In a hydrocarbon burning apparatus, a hydrocarbon burner as for cooking or for any heating purpose which may require an indefinite time of operation, a main liquid fuel and air reservoir, means for supplying air under pressure to said reservoir, an auxiliary liquid fuel and air receiving receptacle, air and liquid conduits establishing communication between said reservoir and receptacle for supplying air and fuel to said receptacle under pressure, a valve member associated with the air conduit to render the pressure within the reservoir effective to move the liquid from the reservoir to the receptacle upon a reduction of the quantity of fuel in the receptacle, means associated with the receptacle for mixing the fuel and air, and valve means for controlling said supply of the mixed fuel and air to the burner.

32. A liquid fuel burner and fuel conditioning system for cooking and other purposes, comprising a burner, a main liquid fuel and air reservoir suitable to be located outside of a building, an auxiliary liquid fuel and air reservoir suitable to be located inside of a building, means automatically controlled for directing air under pressure into said main reservoir, a conducting passage for conveying fuel under pressure from said main reservoir to said auxiliary reservoir, a conducting passage for conveying air under pressure from said main reservoir to said auxiliary reservoir, valve means automatically controlled for maintaining a predetermined average amount of fuel in said auxiliary reservoir, means for creating an atomized mixture of said fuel and air, a nozzle from which the atomized mixture of fuel and air passes, a Bunsen tube for receiving said mixture of fuel and air and for conducting said fuel and air and additional air to the burner for combustion at the burner outlet.

33. A liquid fuel burner and fuel conditioning system, comprising a burner, a main liquid fuel and air reservoir, an auxiliary liquid fuel and air reservoir, said main reservoir being located remotely from the auxiliary reservoir, a conducting passage for conveying fuel under pressure out from said main reservoir to said auxiliary reservoir, a conducting passage for conveying air under pressure out from said main reservoir to the auxiliary reservoir, means for creating an atomized mixture of said fuel and air, a nozzle from which said fuel and air passes and a burner inlet for directing the mixture of fuel and air to the burner for supplying combustion at the burner outlet, means automatically controlled for storing air under pressure into the main reservoir, and means for maintaining a predetermined average amount of fuel in the auxiliary reservoir through all time of the burner operation as may be required for cooking or other purposes.

34. A liquid fuel burner and fuel conditioning system comprising a burner, a main liquid fuel and air reservoir, an auxiliary liquid fuel and air reservoir, means automatically controlled for directing air under pressure into said main reservoir, means for conducting fuel and air under pressure out from the main reservoir to the auxiliary reservoir, means for atomizing said fuel and air, a nozzle from which said fuel and air passes, a Bunsen tube for receiving said fuel and air, and for conducting the fuel and air and additional air to the burner for supplying combustion at the burner outlet, means for maintaining a predetermined average amount of fuel in the auxiliary reservoir through all time of the burner operation as may be required for cooking or other purposes.

35. A liquid fuel burner and fuel conditioning system, comprising a burner, a main fuel and air reservoir, an auxiliary fuel and air reservoir, means for creating an atomized mixture of said fuel and air, a nozzle from which said mixture of fuel and air passes, a burner inlet for admitting said mixture to the burner for supplying combustion at the burner outlet, means automatically controlled for maintaining a predetermined average amount of air pressure in the main fuel and air reservoir and for supplying a predetermined average amount of fuel and air to the auxiliary fuel and air reservoir through all time of the burner operation as may be required for cooking or other purposes.

36. A liquid fuel burner and fuel conditioning system, comprising a burner, a fuel and air reservoir, means for creating an atomized mixture of said fuel and air, a nozzle from which said mixture of fuel and air passes, a burner inlet for admitting said mixture of fuel and air to the burner for supplying combustion at the burner outlet, means for maintaining a predetermined average amount of air pressure in said reservoir through all time of the burner operation as may be required for cooking or other purposes.

37. A liquid fuel burner and fuel conditioning system, comprising a burner, means automatically controlled for supplying fuel and air under pressure thereto, said means including, means for creating an atomized mixture of the fuel and air, a nozzle from which said mixture of fuel and air passes, a burner inlet for admitting said mixture to the burner for supplying combustion at the burner outlet, and means for supplying to said atomizing means a continuous average amount of pressure of the air and fuel which forms said mixture to permit continuous operation of the flame at the burner outlet.

FRANK V. RISINGER.